United States Patent
Salsman

(10) Patent No.: US 8,780,086 B2
(45) Date of Patent: Jul. 15, 2014

(54) SYSTEM WITH OPTICAL SENSOR FOR DETECTING USER INPUT

(75) Inventor: Kenneth Edward Salsman, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 327 days.

(21) Appl. No.: 13/149,503

(22) Filed: May 31, 2011

(65) Prior Publication Data
US 2012/0200533 A1    Aug. 9, 2012

Related U.S. Application Data

(60) Provisional application No. 61/440,039, filed on Feb. 7, 2011.

(51) Int. Cl.
*G06F 3/042*    (2006.01)

(52) U.S. Cl.
USPC ............................. 345/175; 345/156; 345/166

(58) Field of Classification Search
USPC ............... 345/163, 175, 156, 166; 359/205.1, 359/239; 356/364
See application file for complete search history.

(56) References Cited

U.S. PATENT DOCUMENTS

| | | | |
|---|---|---|---|
| 7,161,675 B2* | 1/2007 | Kishikawa et al. | 356/364 |
| 7,348,969 B2 | 3/2008 | Robrecht et al. | |
| 8,072,667 B2* | 12/2011 | Suzuki et al. | 359/205.1 |
| 2009/0115727 A1* | 5/2009 | Wu | 345/163 |
| 2010/0079408 A1 | 4/2010 | Leong et al. | |
| 2010/0195183 A1* | 8/2010 | Sakai et al. | 359/239 |

* cited by examiner

*Primary Examiner* — Thuy Pardo
(74) *Attorney, Agent, or Firm* — Treyz Law Group; G. Victor Treyz; Kendall P. Woodruff

(57) ABSTRACT

A light-based input device may be based on a wedge-shaped light-guide structure. Light may be introduced into the interior of the light-guide structure from a light source and corresponding reflected light exiting the light-guide structure may be measured using a light detector such as an image sensor. The location at which a user places an object in contact with an upper surface of the light-guide structure may be detected by analyzing the pattern of reflected light that exits the light-guide structure. Multiple layers of light-guide structures may be separated from each other by opaque material such as plastic so that the device can determine the direction in which the object is traversing the light-guide layers. A light-based input device may be implemented using free-space light beams that are interrupted by the user. Keys may be provided in a light-based input device by movably mounting contact pads to a light-guide structure.

7 Claims, 4 Drawing Sheets

SYSTEM WITH OPTICAL SENSOR FOR DETECTING USER INPUT

This application claims the benefit of provisional patent application No. 61/440,039, filed Feb. 7, 2011, which is hereby incorporated by reference herein in its entirety.

BACKGROUND

This relates generally to systems that gather user input and, more particularly, to systems with light-based input devices for gathering user input.

Electronic devices often have input-output components. For example, an electronic device may contain an output component such as a display or status indicator light for providing visual output to a user or may have a speaker or buzzer for providing audible output to a user. Input components such as electrical switches may be used to form keyboards, dedicated buttons, and other electromechanical input devices.

It may be desirable in some electronic devices to use other types of input devices. For example, it may be desirable to use light-based input devices that can accept input in ways that would be difficult or impossible using electromechanical input devices based on switches.

DETAILED DESCRIPTION

Figure 1:
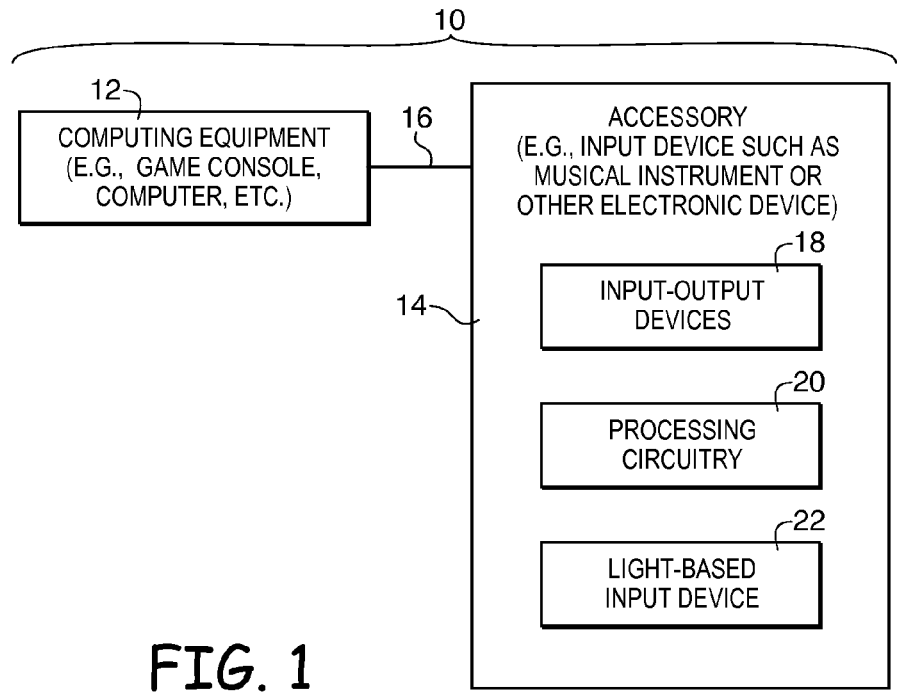
FIG. 1 is a diagram of an illustrative system of the type that may use a light-based input device in accordance with an embodiment of the present invention.

An illustrative system in which a light-based input device may be used is shown in FIG. 1. As shown in FIG. 1, system 10 may include an accessory 14 that includes a light-based input device 22. Accessory 14 may be a musical instrument such as a keyboard, a guitar, or other electronic device.

Accessory 14 may optionally be connected to external electronic equipment 12 such as a computer or game console. Accessory 14 may, for example, be coupled to equipment 12 using communications path 16. Path 16 may be a wireless path or a wired path (e.g., a Universal Serial Bus path). User input from accessory 14 may be used to control equipment 12. For example, user input from accessory 14 may allow a user to play a game on computing equipment 12 or may allow a user to supply information to other applications (e.g., music creation application, etc.).

Light-based input device 22 may contain a light source and a light sensing component. The light source may emit light that is detected by the light sensing component. A user of system 10 may supply input to light-based input device 22 using a finger or other object that produces measurable light intensity fluctuations at the light sensing component. In response, light-based input device 22 may supply corresponding output signals to processing circuitry 20. Processing circuitry 20 may include a microprocessor, application-specific integrated circuits, memory circuits and other storage, etc. Input-output devices 18 may include components such as a display, a speaker, a light-emitting diode or other status indicator, etc.

The operation of device 14 may be controlled using input that is gathered from light-based input-device 22. For example, user input from device 14 may be processed by processing circuitry 20. Processing circuitry 20 may then direct input-output devices 18 to take suitable actions in response to the user input. For example, processing circuitry 20 may supply output to the user that depends on the user input commands received with light-based input device or processing circuitry 20 may relay user commands that are received with light-based input device 22 to external equipment 12 via path 16.

Figure 2:
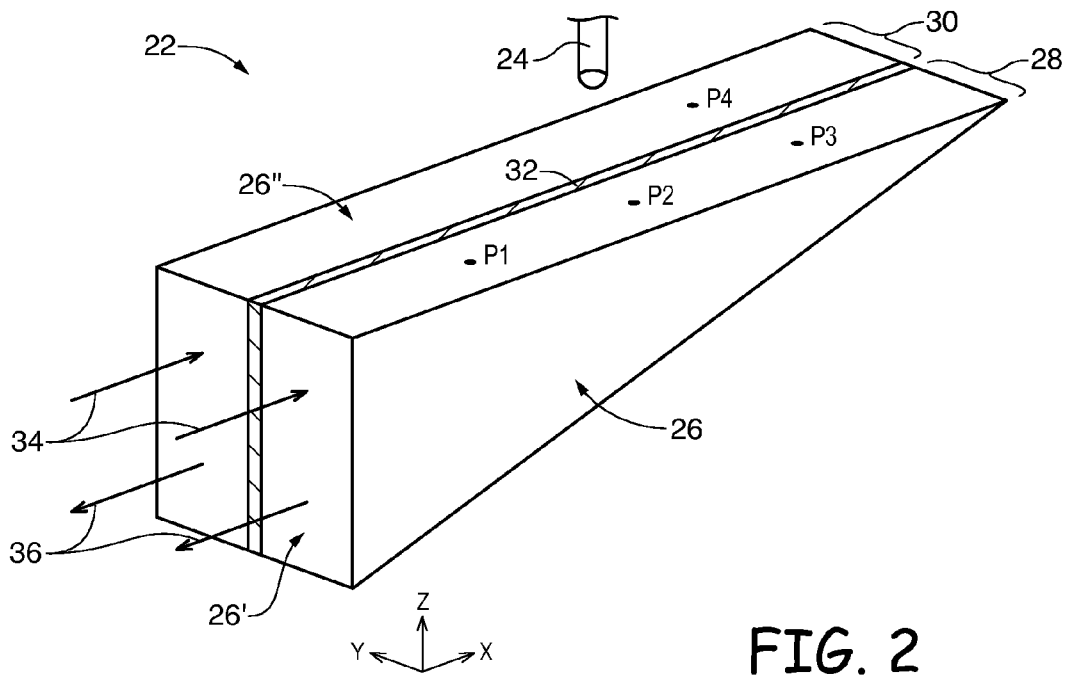
FIG. 2 is a perspective view of an illustrative light-based input device in accordance with an embodiment of the present invention.

An illustrative configuration that may be used for light-based input device 22 is shown in FIG. 2. As shown in FIG. 2, light-based input device 22 may have an optically transparent structure such as light-guide (waveguide) structure 26. Light-guide structure 26 may be formed from one or more optically isolated layers. In the example of FIG. 2, light-guide structure 26 has been formed from two separate light-guide layers (layers 28 and 30). First light-guide layer 28 and second light guide layer 30 are separated by opaque material 32. Light-guide layers 28 and 30 may be formed from clear plastic, glass, or other transparent materials. Opaque material 32 may be formed from black plastic or other materials that block light.

A light source may supply end face 26' of light-guide structure 26 with light 34. Light 34 may travel within light-guide structure 26 and, due to total internal reflection, may reflect from the interfaces between light-guide structure 26 and the surrounding environment. Light 34 may also be reflected off of user's finger or other object 24 when object 24 contacts upper surface 26" of light-guide structure 26. This causes additional reflected light 36 to exit end face 26' (or, in some configurations, causes less light 36 to exit face 26'). Light 36 may be analyzed using light detecting structures such as photodetectors or image sensors. The data collected by the light-detecting structures may be analyzed to determine the location of contact of object 24 on surface 26".

In the example of FIG. 2, object 24 has contacted upper surface 26" of light guide structure 26 in four locations: P1, P2, P3, and P4. Three of these locations (P1, P2, and P3) are located on light-guide structure 28 and one of these locations (P4) is located on light guide structure 30. By analyzing signals gathered with the light-detecting structures in input device 22, each of these locations can be identified and appropriate action taken in system 10 (FIG. 1). For example, the location of user input may be used to control a musical instrument controller that is attached to a game console (as just one example).

Figure 3:
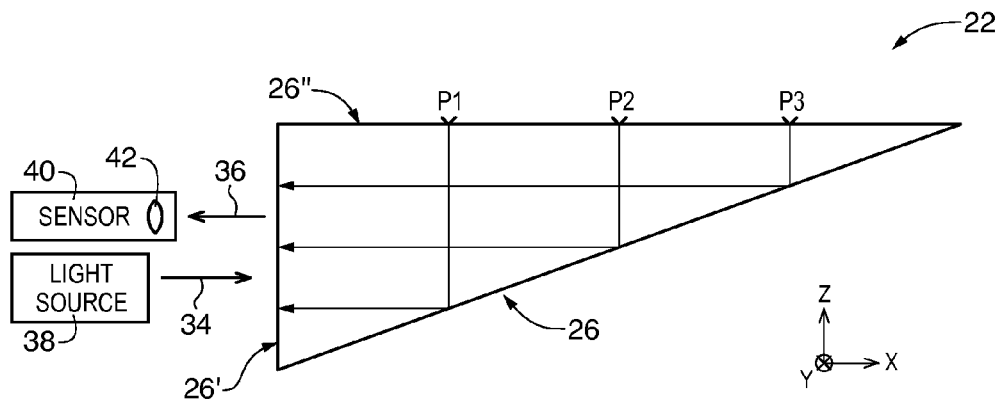
FIG. 3 is a side view of an illustrative light-based input device in accordance with an embodiment of the present invention.

FIG. 3 is a side view of light-guiding structures 26 in light-based input device 22. As shown in FIG. 3, light-based input device 22 may have a light source such as light source 38. Light source 38 may include one or more lasers, one or more light-emitting diodes, one or more lamps, or other sources of illumination. Light 34 from light source 38 may be directed into light-guide structures 26 through end face 26'.

Light-based input device 22 may also include light-detecting structures such as sensor 40. Sensor 40 may have imaging optics such as one or more lenses (shown schematically as lens 42). Sensor 40 may be implemented using one or more image sensor array integrated circuits (e.g., complementary metal-oxide-semiconductor image sensor integrated circuits having two-dimensional arrays of image sensor pixels). Using lens 42 and the image sensor array in sensor 40, sensor 40 may image the pattern of light appearing on end face 26. A diagram of end face 26' of light-guide structures 26 showing the location of reflected light 36 in response to contact between object 24 and upper surface 26" when surface 26" is contacted in locations P1, P2, P3, and P4 is shown in FIG. 4.

Figure 4:
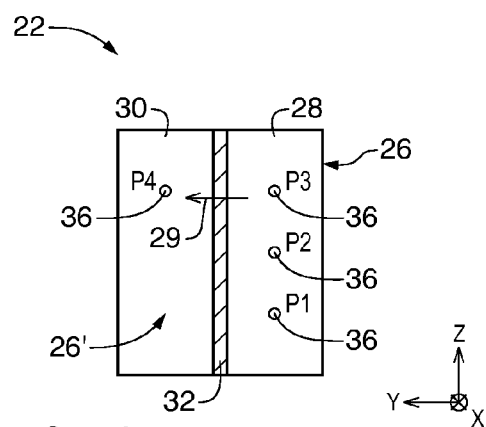
FIG. 4 is an end view of an illustrative light-based input device of the type shown in FIG. 3 showing where reflected light signals may appear when the upper surface of the input device is contacted by a user's finger or other object in accordance with an embodiment of the present invention.

As shown in FIGS. 3 and 4, different points of contact between object 24 and upper surface 26" may produce identifiable patterns of light 36. For example, light 36 that is reflected when object 24 contacts point P1 may be brighter and located at a lower height (z-dimension) than light 36 that is reflected when object 24 contacts points P2 and P3. Light 36 that is reflected when object 24 contacts point P4 can be distinguished from light 36 that is reflected when object 24 contacts point P3 by the location of the light in lateral dimension y. The inclusion of opaque layer 30 may help prevent stray light from passing between light-guide structures 28 and 30 and may therefore help ensure that image sensor 40 can discriminate between contact points located on structure 28 (such as point P3) and contacts points located on structure 30 (such as point P4).

When used in an accessory such as a guitar or other electronic device, a user may move object 24 from points such as point P3 on structure 28 to points such as point P4 on structure 30 (e.g., as part of a strumming motion in direction 29 or as part of other motions). Sensor 40 may detect the direction of the strumming motion by determining whether reflected light 36 moves from light-guide structure 28 to light-guide structure 30 or vice versa. Situations in which the detected intensity of light 36 is equal from both light-guide structure 28 and light-guide structure 30 may be interpreted as a damping or hold command. Differences in the location of object 24 along dimension x that are detected by measuring the location of reflected light 36 along dimension z may be used to determine the longitudinal location along a virtual string that is being plucked by a user. The pressure of object 24 against light-guide structures 26 may result in a flattening and widening of object 24 at the surface of light-guide structure 26 and may result in corresponding additional amounts of reflected light 36. The amount of light that is detected at any given point on end face 26' may therefore be used to determine user input pressure. If desired, light intensity measurements may take into account the location of the detected light along dimension z (i.e., to correct for the greater amount of reflected light that may be received at lower z values for a given contact pressure).

Figure 5:
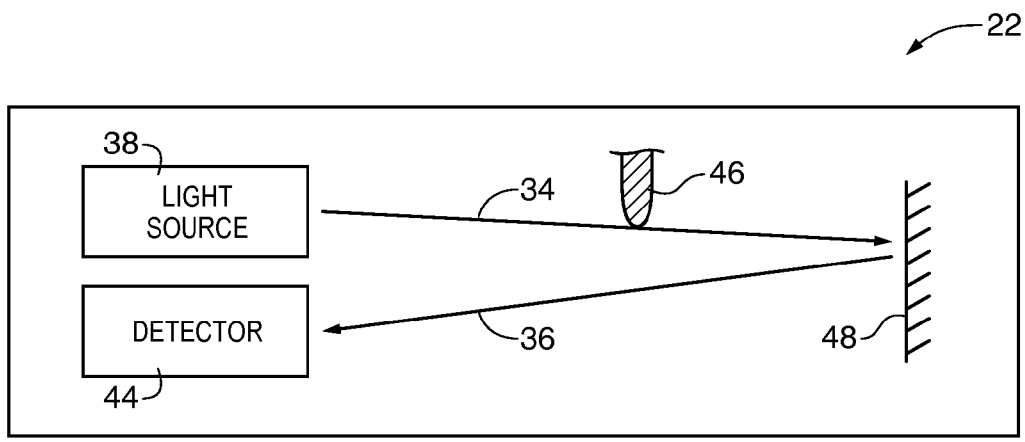
FIG. 5 is a top view of an illustrative light-based input device in which user input may be gathered when an input structure that the user manipulates breaks a light beam in accordance with an embodiment of the present invention.

If desired, light-based input device 22 may generate one or more beams of light. User input may be detected when a user's finger or other input object interrupts the beam(s). As shown in FIG. 5, for example, light-based input device 22 may include a light source such as light source 38 that generates outgoing light beam 34. Mirror 48 may reflect outgoing light beam 34 back towards light detector 44. Corresponding reflected light beam 36 may then be received by detector 44.

Light source 38 of light-base input device 22 of FIG. 5 may be a laser, a light-emitting diode, a lamp, or other device that emits light. One or more lenses may be included in light source 38 to produce a narrow collimated output beam. Mirror 48 may be based on a silvered glass structure, a prism-based mirror, reflective gratings, a dielectric mirror (e.g., a mirror formed from alternating high-index-of-refraction and low-index-of-refraction layers, etc.), or other suitable structure for reflecting light. Detector 44 may be a photodetector, an array of photodetectors, an image sensor integrated circuit configured to detect the magnitude of reflected light 36, or other suitable photosensitive device. Although shown as following two discrete paths in FIG. 5, outgoing light beam 34 and reflected light beam 36 may, if desired be substantially collinear. When object 46 interrupts the light beam(s) in device 22, the amount of light that is detected by detector 44 decreases. By monitoring and detecting fluctuations in received light intensity, detector 44 can determine when a user has interposed object 46 within the light beam. This user input can be provided to processing circuitry 20 (FIG. 1), so that suitable action may be taken in accessory 14.

Figure 6:
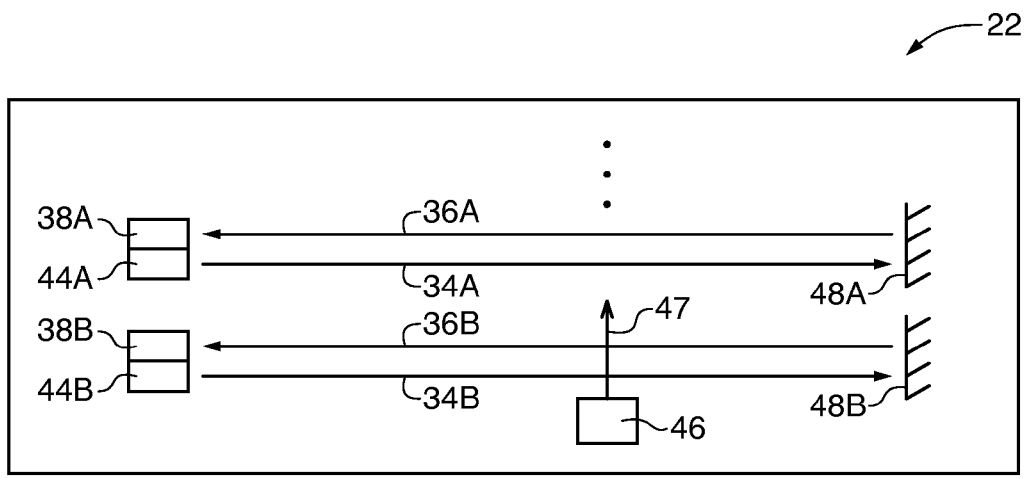
FIG. 6 is a graph of an illustrative light-based input device in which multiple light beams are used to gather user input direction information in accordance with an embodiment of the present invention.

As shown in FIG. 6, light-based input device 22 may have two or more independent light beams. The upper beam in the FIG. 6 example is associated with light source 38A and light detector 44A. The lower beam in the FIG. 6 example is associated with light source 38B and light detector 44B. Light source 38A may produce outgoing beam 34A. Light detector 44A may detect corresponding reflected beam 36A after beam 34A has been reflected from mirror 48A. Mirror 48B may reflect light beam 34B from light source 38B back towards light detector 44B as reflected light beam 36B.

A user may move a finger or other object across the light beams as shown by illustrative upward movement 47 of object 46 in the example of FIG. 6. Each time a beam is broken by the imposition of object 46 within the beam, the corresponding light detector may detect a light intensity fluctuation (e.g., a reduction in reflected light intensity). The signals from the beams and the relative timing between these signals may be used to detect the speed and direction of the movement of object 46. If, for example, a user move object 46 upwards in direction 47, detector 44B may detect momentary dimming of beam 34B followed by detection of a similar momentary dimming of beam 34A by light detector 44A. Because beam 34B dimmed before beam 34A (in this example), it can be concluded that the movement of object 46 was in the upwards direction (i.e., direction 47). The speed of the movement may also be determined. When object 46 is moved in the opposite direction (i.e., downwards in the orientation of FIG. 6), beam 34A will dim before beam 34B.

Figure 7:
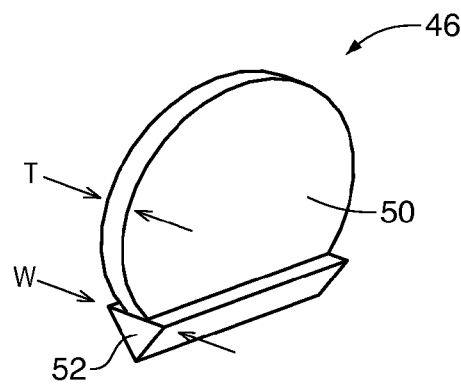
FIG. 7 is a perspective view of an illustrative input member that a user may use to interact with one or more light beams in a light-based input device in accordance with an embodiment of the present invention.

Input object 46 may have a size and shape that allows object 46 to block some or all of the light in each light beam. With one suitable arrangement, input object 46 may be formed from a member having a relatively small size that allows object 46 to be held between the fingers of a user. An illustrative configuration for input object 46 is shown in FIG. 7. As shown in the illustrative perspective view of object 46 of FIG. 7, object 46 may have the overall shape and size of a guitar pick (as just one example). In particular, object 46 may have a planar member such as planar member 50 and an enlarged base member portion such as base portion 52. Base portion 52 may have a width W that is larger than thickness T of planar member 50 to enhance the ability of base portion 52 to break the light beam during use. The configuration for input object 46 that is shown in FIG. 7 is merely illustrative. A user body part or objects of other suitable shapes and sizes may be used to interact with light beams in light-based input device 22 if desired.

Figure 8:
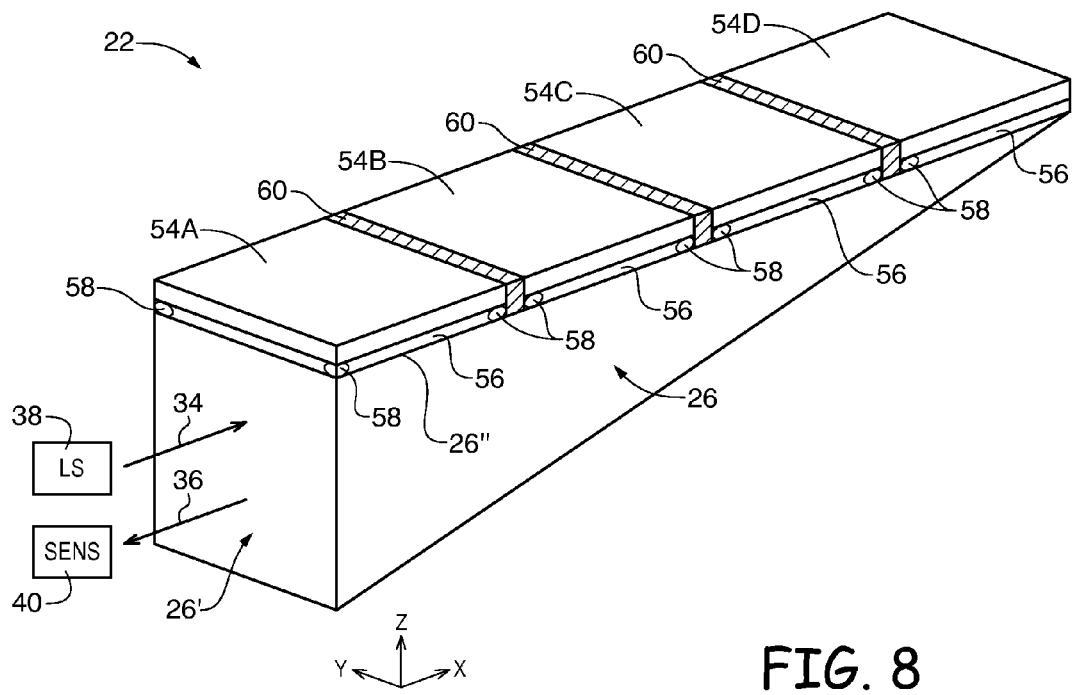
FIG. 8 is a perspective view of an illustrative light-based input device having multiple individually selectable control pads in accordance with an embodiment of the present invention.

Another suitable arrangement for light-based input device 22 is shown in FIG. 8. As shown in the perspective view of FIG. 8, light-based input device 22 may have a wedge shaped light-guide structure such as light guide structure 26. Light source 38 may generate outgoing light 34 that enters light-guide structure 26 through end face 26'. Following reflection from within light-guide structures 26, corresponding reflected light 36 may be emitted from end face 26'. A light detector such as light sensor 40 may be used to detect reflected light 36. Light source 38 may be formed form one or more lasers, light-emitting diodes, lamps, or other light-emitting structures. Light sensor 40 may be formed from an array of photodetectors or an image sensor integrated circuit. Optical structures such as one or more lenses may be provided in sensor 40 to allow sensor 40 to image end face 26'.

Light-based input device 22 of FIG. 8 may include movable control structures such as control pads 54A, 54B, 54C, and 54D. There are four control pads in the example of FIG. 8 separated by three interposed opaque structures 60, but this is merely illustrative. In general, light-based input device 22 may have fewer than four control pads, fewer than three control pads, more than three control pads, more than four control pads, etc. Each control pad may be movably mounted on one or more springs 58. Springs 58 may maintain a gap such as gap 56 between control pads 54A, 54B, 54C, and 54D and upper surface 26" of light-guide structures 26. Gap 56 may be an air gap of about 0.2 to 3 mm, less than 3 mm, more than 3 mm, or other suitable size. Springs 58 may be formed from an elastomeric substance such as foam, coil springs, leaf springs, springs formed from spring metal, or other suitable spring structures. Control pads 54A 54B, 54C, and 54D may be formed from a material such as plastic (as an example).

When control pads 54A, 54B, 54C, and 54D are in their nominal (not depressed) configuration, air gaps 56 prevent light in light-guide structure 26 from escaping due to the principal of total internal reflection. When, however, a user depresses one of the control pads, total internal reflection may be locally defeated in the portion of surface 26" that lies under the depressed control pad. As an example, consider a situation in which control pad 54B is depressed by a user's finger or other object. When control pad 54B moves downwards so that the lower surface of control pad 54B contacts upper surface 26", reflected light may escape (i.e., total internal reflection may be defeated and light may tend to escape light-guide structure 26 into and/or through control pad 54B).

Figure 9:
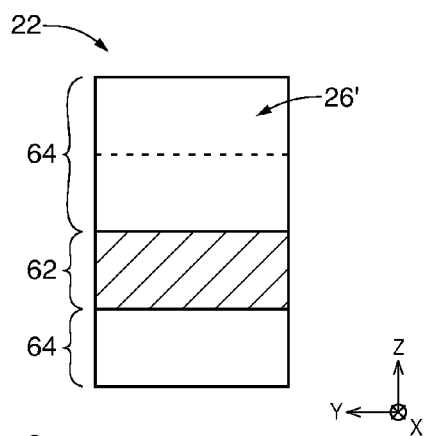
FIG. 9 is an illustrative end view of a light-based input device of the type shown in FIG. 8 in a configuration in which the user has depressed one of the control pads in accordance with an embodiment of the present invention.

An illustrative reflected light pattern that may be produced when control pad 54B has been depressed is shown in FIG. 9. As shown in FIG. 9, region 62 may be locally darkened with respect to regions 64. The position (e.g., height along dimension z) of the darkened region with respect to the other portions of end face 26' may be detected using image sensor 40. If desired, control pads 54A, 54B, 54C, and 54D may be provided with structures such as reflecting lower surfaces that increase rather than decrease light reflection when depressed. In this type of scenario, the position of a locally lightened region in end face 26' may be used to determine which control pad has been depressed. The amount by which the light corresponding to the depressed control pad increases (or decreases) may be used as a measure of how firmly the control pad has been depressed (i.e., to measure input pressure).

Arrangements of the type shown in FIGS. 8 and 9 may be used to implement a key-type controller for a guitar or other musical instrument. The use of keys such as keys based on control pads 54A, 54B, 54C, and 54D may simplify user input tasks and may be helpful when using light-based device 22 in a game or other environment where simplicity and ease of use are desired.

As described in connection with FIG. 1, light-based input device 22 may be used in any suitable electronic device. Examples in which light-based input devices 22 are used in accessories such as guitars, keyboards, and other musical instruments have sometimes been presented as examples. This is, however, merely illustrative. Light-based input devices 22 may be used in any suitable systems that gather user input from a user. Examples of environments in which light-based control systems may be advantageous include environments in which the sparks that sometimes result from actuation of conventional electromechanical switches are dangerous (e.g., in refineries, flour mills, and other industries with flammable atmospheres), environments in which clicking noise from conventional switches is not desirable (e.g., music production environments), high-reliability environments in which potential failures from mechanical switch wear are not acceptable, etc.

Various embodiments have been described illustrating light-based input devices that may be used in accessories such as musical instruments and other electronic devices. A light-based input device may be based on a wedge shaped light-guide structure. Light may be introduced into the interior of the light-guide structure from a light source and corresponding reflected light may be measured using a light detector such as an image sensor array or an array of photodetectors. The location at which a user places a finger or other object in contact with an upper surface of the light-guide structure may be detected by analyzing the pattern of reflected light that exits the light-guide structure. Multiple layers of light-guide structures may be separated from each other by opaque material such as plastic. When the point of contact of the external object moves from one of the light-guide structure layers to another, movement of the external object may be detected by measuring the direction of movement of reflected light exiting the light-guide structure. If desired, a light-guide input device may be implemented using free-space light beams. An input device such as a guitar pick with an enlarged base may be used to intersect the light beams and thereby provide user input. A light-based input device may have keys. The keys may be formed from control pads that are mounted on a wedge-shaped light-guide structure using springs. When depressed, a control pad contacts the light-guide structure and produces a detectable change in the reflected light pattern emitted from the light-guide structure.

The foregoing is merely illustrative of the principles of this invention which can be practiced in other embodiments.

What is claimed is:

1. An input device for gathering user input in an electronic device, comprising:
    a light-guide structure;
    a light source that supplies light to the light-guide structure;
    an image sensor that detects contacts between an object that is manipulated by a user and the light-guide structure, wherein the light-guide structure comprises a wedge-shaped transparent member having an upper surface and an end face, wherein the image sensor measures reflected light patterns on the end face that result from contact between the object and the upper surface, wherein the image sensor is configured to detect different light patterns depending on which location along the upper surface is contacted by the object, wherein the light-guide structure comprises first and second light-guide structure layers that are separated by an opaque layer and wherein the image sensor is configured to determine from the measured reflected light patterns which of the first and second light-guide structure layers is being contacted by the object and is configured to determine a direction of movement of the object relative to the light-guide structure.

2. The input device defined in claim 1 wherein the object comprises a user's finger and wherein the upper surface comprises a planar surface along which the user's finger contacts the light-guide structure.

3. The input device defined in claim 1 wherein the light source comprises a light source selected from the group consisting of: a laser, a light-emitting diode, and a lamp, and wherein the light sensor comprises an image sensor array integrated circuit having a two-dimensional array of image sensor pixels.

4. A light-based input system for an electronic device, comprising:
an input member that is manipulated by a user of the electronic device; and
a light-based input device having a light source that produces a beam of light and a light detector that detects the beam of light, wherein the light detector is configured to detect light intensity fluctuations in the beam of light, wherein the light detector comprises at least one image sensor, and wherein the image sensor comprises a two-dimensional array of image sensor pixels; and a mirror that reflects the beam of light from the light source to the light detector, wherein the light detector is configured to detect the light intensity fluctuations in the beam of light when the input member interrupts the beam of light between the mirror and the light detector.

5. The light-based input system defined in claim 4, wherein the electronic device comprises a musical instrument, wherein the input member comprises a pick, and wherein the pick comprises a planar portion having a thickness and a base portion having a width greater than the thickness.

6. The light-based input system defined in claim 4 wherein the light-based input device produces a pair of parallel light beams and wherein the light detector comprises one of a pair of light detectors that are configured to detect light intensity fluctuations in each of the pair of parallel light beams as the input member passes through each of the parallel light beams.

7. The light-based input system defined in claim 6 wherein the electronic device comprises a guitar, wherein the input member comprises a guitar pick, and wherein the light detectors are configured to detect light intensity fluctuations as the user strums the guitar with the guitar pick.

* * * * *